| (12) | United States Patent | (10) Patent No.: US 11,815,024 B2 |
|---|---|---|
| | Niergarth et al. | (45) Date of Patent: Nov. 14, 2023 |

(54) THERMAL MANAGEMENT SYSTEM

(71) Applicant: General Electric Company, Schenectady, NY (US)

(72) Inventors: Daniel Alan Niergarth, Cincinnati, OH (US); Adon Delgado, Jr., Cincinnati, OH (US); Brandon Wayne Miller, Liberty Township, OH (US); Hendrik Pieter Jacobus de Bock, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/375,489

(22) Filed: Jul. 14, 2021

(65) Prior Publication Data

US 2021/0340914 A1    Nov. 4, 2021

Related U.S. Application Data

(63) Continuation of application No. 15/819,443, filed on Nov. 21, 2017, now Pat. No. 11,125,165.

(51) Int. Cl.
  *F02C 7/224*  (2006.01)
  *F02C 7/141*  (2006.01)
  (Continued)

(52) U.S. Cl.
  CPC .............. *F02C 7/224* (2013.01); *F02C 7/14* (2013.01); *F02C 7/141* (2013.01); *F28F 23/00* (2013.01);
  (Continued)

(58) Field of Classification Search
  CPC ...... F02C 6/08; F02C 9/18; F02C 7/12; F02C 7/141; F02C 7/224; B64D 13/06;
  (Continued)

(56) References Cited

U.S. PATENT DOCUMENTS

| 2,582,842 | A | * | 1/1952 | Messinger | ............. | B64D 13/08 |
|---|---|---|---|---|---|---|
| | | | | | | 237/19 |
| 3,895,243 | A | | 7/1975 | Amend et al. | | |

(Continued)

FOREIGN PATENT DOCUMENTS

| EP | 2003311 A2 | 12/2008 | | |
|---|---|---|---|---|
| EP | 3018304 A1 | * 5/2016 | ........... | F01D 25/162 |

(Continued)

OTHER PUBLICATIONS https://www.engineeringtoolbox.com/standard-atmosphere-d_604.html (Year: 1976).*

*Primary Examiner* — Craig Kim
(74) *Attorney, Agent, or Firm* — Dority & Manning, P.A.

(57) ABSTRACT

A gas turbine engine includes a turbomachine and a thermal management system. The thermal management system includes a heat source heat exchanger configured to collect heat from the turbomachine during operation; a heat sink heat exchanger; and a thermal transport bus having a heat exchange fluid configured to flow therethrough at a pressure within an operational pressure range. The thermal management system defines an operational temperature range for the heat exchange fluid, the operational temperature range having a lower temperature limit less than about zero degrees Fahrenheit at a pressure within the operational pressure range and an upper temperature limit of at least about 1000 degrees Fahrenheit at a pressure within the operational pressure range.

19 Claims, 4 Drawing Sheets

(51) Int. Cl.
*F28F 23/00* (2006.01)
*F02C 7/14* (2006.01)
*F28F 27/02* (2006.01)

(52) U.S. Cl.
CPC .... *F05D 2220/323* (2013.01); *F05D 2240/12* (2013.01); *F05D 2260/213* (2013.01); *F28F 27/02* (2013.01); *F28F 2250/06* (2013.01)

(58) Field of Classification Search
CPC ...... B64D 13/08; F28F 27/02; F05D 2220/50; F25B 25/005; F25B 7/00; F25B 31/026; F25B 2400/072; F28D 2021/0021
See application file for complete search history.

(56) References Cited

U.S. PATENT DOCUMENTS

| | | |
|---|---|---|
| 4,505,124 A | 3/1985 | Mayer |
| 4,550,573 A | 11/1985 | Rannenberg |
| 4,773,212 A | 9/1988 | Griffin et al. |
| 5,149,018 A | 9/1992 | Clark |
| 5,341,636 A | 8/1994 | Paul |
| 5,667,168 A | 9/1997 | Fluegel |
| 5,722,241 A | 3/1998 | Huber |
| 5,724,806 A | 3/1998 | Homer |
| 6,182,435 B1 | 2/2001 | Niggemann et al. |
| 6,250,097 B1 | 6/2001 | Lui et al. |
| 6,415,595 B1* | 7/2002 | Wilmot, Jr. ............. F02C 7/224 60/785 |
| 6,435,454 B1 | 8/2002 | Engelhardt |
| 6,701,717 B2 | 3/2004 | Flatman et al. |
| 7,260,926 B2 | 8/2007 | Sabatino et al. |
| 7,266,946 B2* | 9/2007 | Fletcher ................. F02C 7/224 60/785 |
| 7,377,098 B2 | 5/2008 | Walker et al. |
| 7,398,641 B2 | 7/2008 | Stretton et al. |
| 7,478,525 B2* | 1/2009 | Iya ......................... F02K 1/822 60/761 |
| 7,810,332 B2* | 10/2010 | Olmes .................... F02C 7/141 60/39.17 |
| 7,836,680 B2 | 11/2010 | Schwarz et al. |
| 7,882,704 B2 | 2/2011 | Chen |
| 7,966,807 B2 | 6/2011 | Norris et al. |
| 7,987,676 B2 | 8/2011 | Ast et al. |
| 8,177,884 B2 | 5/2012 | Schmidt et al. |
| 8,261,528 B2 | 9/2012 | Chillar et al. |
| 8,424,285 B2* | 4/2013 | Veilleux, Jr. ........ H05K 7/20218 60/39.83 |
| 8,499,822 B2* | 8/2013 | Bulin ..................... F02C 7/224 165/41 |
| 8,522,572 B2 | 9/2013 | Coffinberry et al. |
| 8,765,070 B2 | 7/2014 | Norton et al. |
| 8,789,377 B1 | 7/2014 | Brostmeyer |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,284,057 B2* | 3/2016 | Kelnhofer ............. B64D 13/06 |
| 9,328,661 B2* | 5/2016 | Ho ............................ F02C 3/13 |
| 9,429,072 B2* | 8/2016 | Diaz ....................... F02C 7/047 |
| 9,567,095 B2 | 2/2017 | McCarthy et al. |
| 9,580,185 B2 | 2/2017 | Rhoden et al. |
| 10,207,809 B2* | 2/2019 | Koerner ................ B64D 13/06 |
| 10,260,419 B2* | 4/2019 | Cerny ....................... F25B 1/00 |
| 11,125,165 B2* | 9/2021 | Niergarth ................ F02C 7/14 |
| 2006/0162371 A1* | 7/2006 | Lui ......................... B64D 13/06 62/402 |
| 2009/0133380 A1 | 5/2009 | Donnerhack |
| 2009/0188234 A1 | 7/2009 | Suciu et al. |
| 2010/0101231 A1 | 4/2010 | Westmeier |
| 2010/0212857 A1 | 8/2010 | Bulin et al. |
| 2010/0313591 A1 | 12/2010 | Lents et al. |
| 2012/0216502 A1 | 8/2012 | Freund et al. |
| 2013/0086927 A1* | 4/2013 | Mills ....................... B64D 13/06 62/238.1 |
| 2013/0186100 A1 | 7/2013 | Rhoden et al. |
| 2014/0165570 A1 | 6/2014 | Herring |
| 2014/0190162 A1* | 7/2014 | Fonseca ................. B64D 15/02 60/273 |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2016/0108814 A1 | 4/2016 | Schmitz |
| 2016/0131036 A1* | 5/2016 | Bintz .................... F01D 25/162 60/726 |
| 2016/0290214 A1 | 10/2016 | Ekanayake et al. |
| 2016/0290233 A1* | 10/2016 | Ekanayake ............ F01D 9/065 |
| 2016/0290235 A1* | 10/2016 | Ekanayake ............ F01D 9/065 |
| 2016/0369700 A1 | 12/2016 | Ribarov et al. |
| 2017/0030266 A1* | 2/2017 | Cerny .................... F02C 7/185 |
| 2017/0057641 A1* | 3/2017 | Koerner ................ F25B 25/005 |
| 2017/0114721 A1* | 4/2017 | Miller ..................... F02C 7/185 |
| 2017/0122206 A1* | 5/2017 | Niergarth ................. F02C 7/10 |
| 2017/0159566 A1 | 6/2017 | Sennoun et al. |
| 2017/0167382 A1 | 6/2017 | Miller et al. |
| 2017/0217592 A1* | 8/2017 | Hinderliter ............ B64D 13/08 |
| 2018/0050811 A1* | 2/2018 | Niergarth ................ B64D 27/18 |
| 2019/0153952 A1* | 5/2019 | Niergarth ................. F02C 7/14 |
| 2019/0153953 A1* | 5/2019 | Niergarth ............... F02C 7/224 |

FOREIGN PATENT DOCUMENTS

| | | | |
|---|---|---|---|
| EP | 3018304 A1 | 5/2016 | |
| EP | 3075957 A1 | 10/2016 | |
| EP | 3124770 A1 * | 2/2017 | ............ F02C 7/06 |
| GB | 2136880 A | 9/1984 | |
| GB | 2204361 A | 11/1988 | |
| JP | S5932893 U | 2/1984 | |
| WO | WO 02/16743 A1 | 2/2002 | |
| WO | WO2002/038938 A1 | 5/2002 | |
| WO | WO2006/079438 A1 | 8/2006 | |
| WO | WO2011/038188 A1 | 3/2011 | |

\* cited by examiner

THERMAL MANAGEMENT SYSTEM

CROSS-REFERENCE TO RELATED APPLICATIONS

This application is a continuation application of U.S. application Ser. No. 15/819,443 filed Nov. 21, 2017, which is hereby incorporated by reference in its entirety.

FIELD

The present subject matter relates generally to a thermal management system, and more specifically to a thermal management system for a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts.

During operation of the gas turbine engine, various systems may generate a relatively large amount of heat. Thermal management systems of the gas turbine engine may collect heat from one or more of these systems to maintain a temperature of such systems within an acceptable operating range. The thermal management systems may reject such heat through one or more heat exchangers.

Typically, these thermal management systems are designed to operate with a designated subset of the systems within the gas turbine engine based on such systems' operating temperatures and thermal management needs. However, such a configuration may lead to, e.g., an increased complexity and decreased efficiency.

Accordingly, the inventors of the present disclosure have found that a thermal management system capable of operating over a wider temperature range would be useful to facilitate accommodation of the various systems within the gas turbine engine.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a turbomachine; and a thermal management system. The thermal management system includes a first heat exchanger configured to collect heat from the turbomachine during operation; a second heat exchanger; and a thermal transport bus having a heat exchange fluid configured to flow therethrough at a pressure within an operational pressure range, the first heat exchanger and second heat exchanger each fluidly coupled to the thermal transport bus such that the first heat exchanger is operable to transfer heat to the heat exchange fluid during at least certain operations and the second heat exchanger is operable to transfer heat from the heat exchange fluid during at least certain operations, the thermal management system defining an operational temperature range for the heat exchange fluid, the operational temperature range having a lower temperature limit less than about zero degrees Fahrenheit at a pressure within the operational pressure range and an upper temperature limit of at least about 1000 degrees Fahrenheit at a pressure within the operational pressure range.

In certain exemplary embodiments the first heat exchanger is a heat recovery heat exchanger.

For example, in certain exemplary embodiments the turbomachine includes a turbine section and an exhaust section, the turbine section and exhaust section together defining at least in part a core air flowpath, and wherein the heat recovery heat exchanger is a waste heat recovery heat exchanger positioned to be in thermal communication with the core air flowpath within or downstream of the turbine section, the exhaust section, or both.

For example, in certain exemplary embodiments the turbomachine includes a fuel delivery system, and wherein the second heat exchanger is a fuel heat exchanger thermally coupled to the fuel delivery system.

In certain exemplary embodiments the turbomachine includes a cooled cooling air system, and wherein the first heat exchanger is thermally coupled to the cooling air system.

In certain exemplary embodiments the lower temperature limit of the operational temperature range at a pressure within the operational pressure range is between about −100 degrees Fahrenheit and about −5 degrees Fahrenheit.

For example, in certain exemplary embodiments the upper temperature limit of the operational temperature range at a pressure within the operational pressure range is between about 1000 degrees Fahrenheit and about 1800 degrees Fahrenheit.

In certain exemplary embodiments heat exchange fluid is at least one of a liquid metal alloy, a molten salt, a silicone oil, an ionic fluid, a pressurized gas, or a supercritical gas.

For example, in certain exemplary embodiments the operational pressure range is greater than zero pounds per square inch and less than about 500 pounds per square inch.

For example, in certain exemplary embodiments heat exchange fluid is a eutectic metal alloy including gallium, indium, and tin.

In certain exemplary embodiments the heat exchange fluid is a pressurized gas.

For example, in certain exemplary embodiments the heat exchange fluid is a supercritical gas, wherein the supercritical gas defines critical point pressure, wherein the operational pressure range is greater than the critical point pressure of the supercritical gas and up to about 8000 pounds per square inch.

For example, in certain exemplary embodiments the heat exchange fluid is a supercritical gas, and wherein the operational pressure range is greater than about 1000 pounds per square inch and less than about 8000 pounds per square inch.

In certain exemplary embodiments, the gas turbine engine further includes an outer nacelle at least partially surrounding the turbomachine; and an outlet guide vane extending between the outer nacelle and the turbomachine, wherein the second heat exchanger is integrated into, or coupled to, the outlet guide vane.

In certain exemplary embodiments the thermal management system further includes a heater thermally coupled to the thermal transfer bus for heating the thermal transfer fluid within the thermal transfer bus.

In certain exemplary embodiments the first heat exchanger is a first heat source heat exchanger, wherein the thermal management system further includes a second heat source heat exchanger, wherein the first heat source heat exchanger is a waste heat recovery heat exchanger, and wherein the second heat source heat exchanger is a cooling air system heat exchanger.

In certain exemplary embodiments the second heat exchanger is a fuel heat exchanger, and wherein the thermal management system further comprises a bypass airflow passage heat exchanger.

In another exemplary embodiment of the present disclosure, gas turbine engine is provided. The gas turbine engine includes a compressor section, a combustion section, a turbine section, and an exhaust section arranged in serial flow order and together defining a core air flowpath. The gas turbine engine also includes a fuel delivery system for providing a flow of fuel to the combustion section. The gas turbine engine also includes a thermal management system. The thermal management system includes a first heat exchanger positioned to be in thermal communication with a flow through the core air flowpath within or downstream of the turbine section, the exhaust section, or both; a second heat exchanger in thermal communication with the fuel delivery system for transferring heat to the flow of fuel provided to the combustion section; and a thermal transport bus having a heat exchange fluid flowing therethrough, the first heat exchanger and second exchanger each fluidly coupled to the thermal transport bus.

In certain exemplary embodiments the thermal management system defines an operational temperature range for the heat exchange fluid, the operational temperature range having a lower temperature limit less than about zero degrees Fahrenheit at a pressure within the operational pressure range and an upper temperature limit of at least about 1000 degrees Fahrenheit at a pressure within the operational pressure range.

For example, in certain exemplary embodiments the heat exchange fluid is at least one of a molten salt, a silicone oil, an ionic fluid, a liquid metal alloy, or a supercritical gas.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
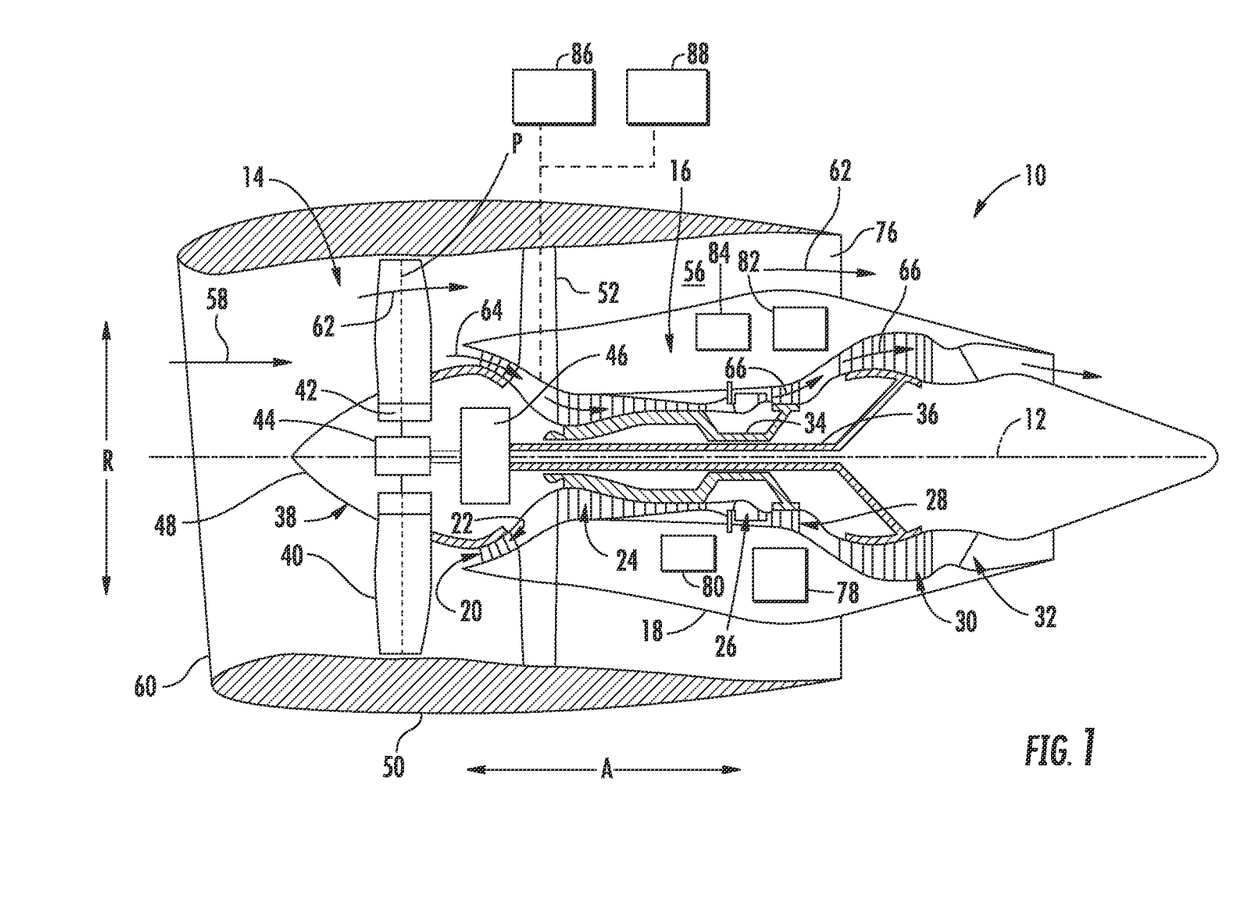
FIG. 1 is a schematic, cross-sectional view of an exemplary gas turbine engine according to various embodiments of the present subject matter.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. As stated, for the embodiment shown, the turbofan engine 10 is a high bypass turbofan engine 10. Accordingly, for the embodiment depicted, the bypass ratio defined by the turbofan engine 10 is greater than about 6:1 and up to about 30:1.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Figure 3:
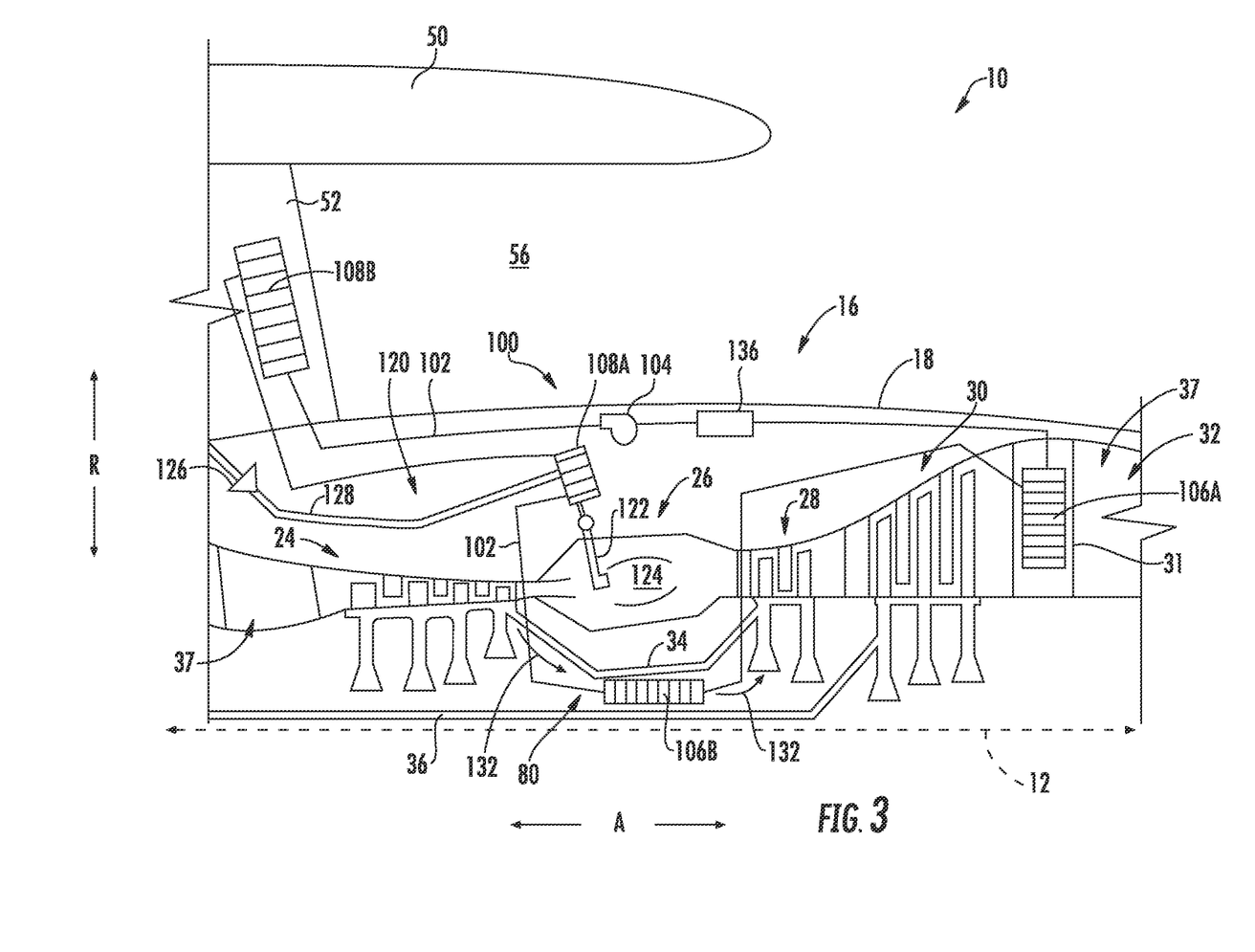
FIG. 3 is a schematic, cross-sectional view of a section of a gas turbine engine including a thermal management system in accordance with an exemplary embodiment of the present disclosure.

Moreover, as is depicted schematically, the exemplary turbofan engine 10 further includes various accessory systems to aid in the operation of the turbofan engine 10 and/or an aircraft including the turbofan engine 10 (see, e.g., FIG. 3). For example, the exemplary turbofan engine 10 further includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a cooling air (CCA) system 80 (sometimes also referred to as a "compressor cooling air system" or "cooled cooling air system") for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the exemplary turbofan engine 10 includes a generator lubrication system 84 for providing lubrication to an electronic generator, as well as cooling/heat removal for the electronic generator. The electronic generator may provide electrical power to, e.g., a startup electric motor for the turbofan engine 10 and/or various other electronic components of the turbofan engine 10 and/or an aircraft including the turbofan engine 10.

As is also depicted schematically, the exemplary turbofan engine 10 depicted drives or enables various other accessory systems, e.g., for an aircraft (not shown) including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 and/or aircraft within a desired range.

Prior turbofan engines 10 and/or aircrafts included individual heat exchangers for each of these accessory systems to remove heat from air and/or lubrication in such systems. However, aspects of the present disclosure may include a thermal management system 100 (see FIGS. 2 and 3) for transferring heat from some or all of such accessory systems to more efficiently remove such heat and/or utilize such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems and may be configured in any other suitable manner. Additionally, or alternatively, the exemplary turbofan engine 10 may not include or be operably connected to one or more of the accessory systems discussed above.

Figure 2:
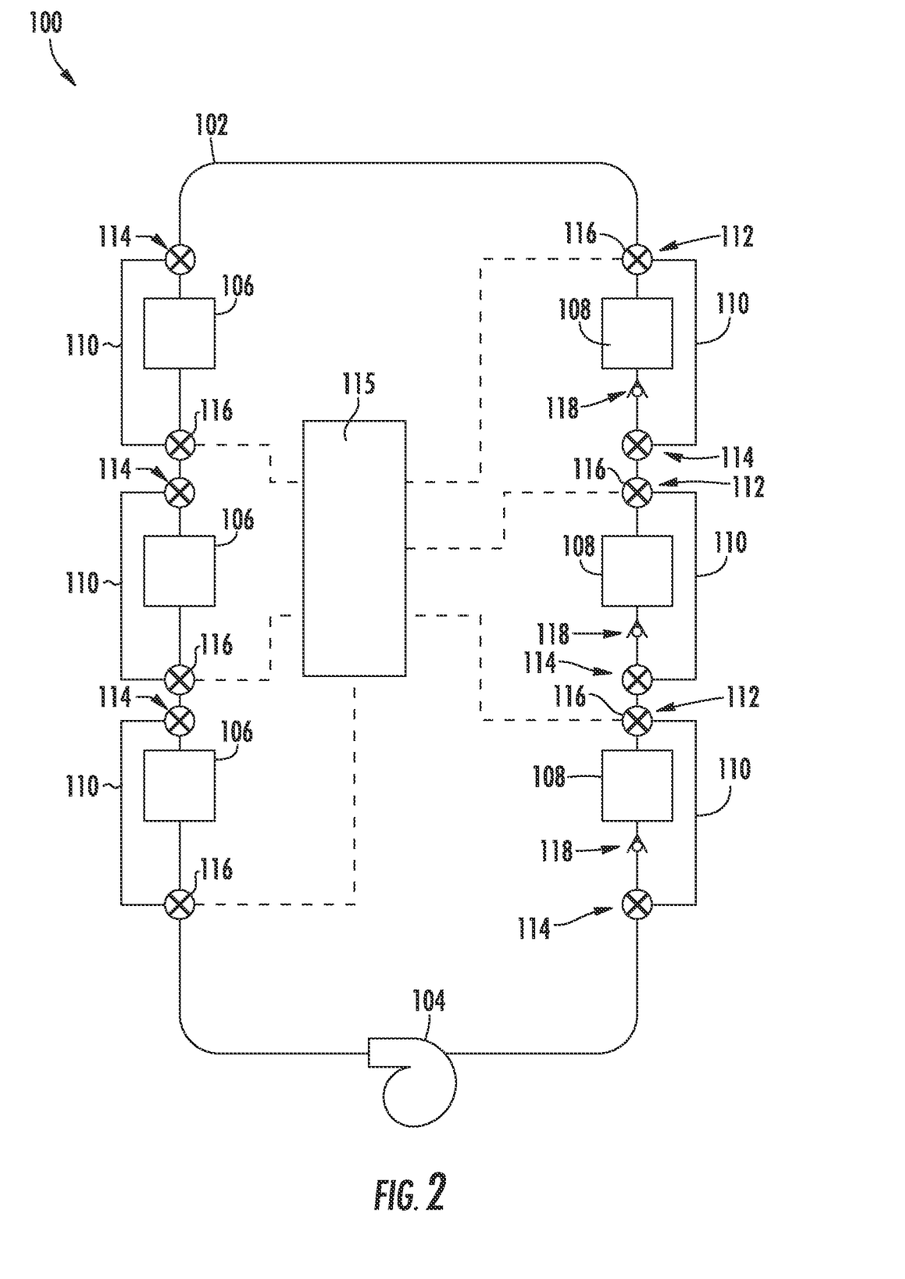
FIG. 2 is a simplified schematic view of a thermal management system in accordance with an exemplary embodiment of the present disclosure.

Referring now to FIG. 2, a schematic, flow diagram is provided of a thermal management system 100 in accordance with an exemplary embodiment of the present disclosure for incorporation at least partially into a gas turbine engine, such as the exemplary turbofan engine 10 of FIG. 1.

As shown, the thermal management system 100 generally includes a thermal transport bus 102. The thermal transport bus 102 includes an intermediary heat exchange fluid flowing therethrough and may be formed of one or more suitable fluid conduits. The heat exchange fluid may have a high temperature operating range, as will be explained in more detail below. A pump 104 is provided in fluid communication with the heat exchange fluid in the thermal transport bus 102 for generating a flow of the heat exchange fluid in/through the thermal transport bus 102. As viewed in FIG. 2, the pump 104 may generate a flow of the heat exchange fluid generally in a clockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the HP shaft 34 or the LP shaft 36 of the turbofan engine 10. In still other embodiments, the pump 104 may be powered by an auxiliary turbine, which in turn may be powered by bleed air from a compressor section of a gas turbine engine within which the system 100 is incorporated.

Moreover, the exemplary thermal management system 100 includes one or more heat source heat exchangers 106 in thermal communication with the thermal transport bus 102, or rather, in fluid communication with the heat exchange fluid within the thermal transport bus 102. Specifically, the thermal management system 100 depicted includes a plurality of heat source heat exchangers 106. The plurality of heat source heat exchangers 106 are each configured to transfer heat from one or more of the accessory systems of the turbofan engine 10 (or operable with the turbofan engine 10) to the heat exchange fluid in the thermal transport bus 102. For example, in certain exemplary embodiments, the plurality of heat source heat exchangers 106 may include one or more of: a heat recovery heat exchanger, such as a waste heat recovery heat exchanger, positioned in, e.g., the turbine section or exhaust section for recovering heat from an airflow therethrough; a CCA system heat source exchanger for transferring heat from a CCA system (such as CCA system 80); a main lubrication system heat exchanger for transferring heat from a main lubrication system (such as main lubrication system 78); an ACC system heat source exchanger for transferring heat from an ACC system (such as ACC system 82); a generator lubrication system heat source exchanger for transferring heat from a generator lubrication system (such as generator lubrication system 84); an ECS heat exchanger for transferring heat from an ECS (such as ECS 86); an electronics cooling system heat exchanger for transferring heat from an electronics cooling system (such as electronics cooling system 88); a vapor compression system heat exchanger; an air cycle system heat exchanger; and an auxiliary system(s) heat source exchanger. By way of example, the auxiliary system(s) heat source exchanger may be configured to transfer heat from one or more of a radar system, a defense system, passenger entertainment systems, etc. Accordingly, a thermal management system 100 in accordance with an exemplary embodiment of FIG. 2 may transfer heat from a variety of independent systems to the heat exchange fluid in the thermal transport bus 102 for removal.

For the embodiment depicted, there are three heat source heat exchangers 106, the three heat source heat exchangers 106 each arranged in series flow along the thermal transport bus 102. However, in other exemplary embodiments, any other suitable number of heat source heat exchangers 106 may be included and one or more of the heat source heat exchangers 106 may be arranged in parallel flow along the thermal transport bus 102. For example, in other embodiments, there may be a single heat source exchanger 106 in thermal communication with the heat exchange fluid in the thermal transport bus, or alternatively, there may be at least two heat source heat exchangers 106, at least four heat source heat exchangers 106, at least five heat source heat exchangers 106, or at least six heat source heat exchangers 106 in thermal communication with heat exchange fluid in the thermal transport bus 102.

Additionally, the exemplary thermal management system 100 of FIG. 2 further includes one or more heat sink exchangers 108 in thermal communication with the thermal transport bus 102, or rather in fluid communication with the heat exchange fluid in the thermal transport bus 102. The one or more heat sink exchangers 108 are located downstream of the plurality of heat source exchangers 106 and are configured for transferring heat from the heat exchange fluid in the thermal transport bus 102, e.g., to atmosphere, to fuel, to a fan stream, etc. For example, in certain embodiments the one or more heat sink exchangers 108 may include at least one of a fuel heat exchanger, a fan stream heat exchanger, a RAM heat exchanger, a bleed air heat exchanger, an engine intercooler, or a cold air output of an air cycle system. The fuel heat exchanger may be a "fluid to heat exchange fluid" heat exchanger wherein heat from the heat exchange fluid is transferred to a stream of liquid fuel for the turbofan engine 10 (by, e.g., a fuel delivery system). Moreover, the fan stream heat exchanger may generally be an "air to heat exchange fluid" heat exchanger which flows, e.g., bypass air from a bypass airflow passage over heat exchange fluid to remove heat from the heat exchange fluid. Additionally, the RAM heat exchanger may be configured as an "air to heat exchange fluid" heat exchanger integrated into one or both of the turbofan engine 10 or an aircraft including the turbofan engine 10. During operation, the RAM heat exchanger may remove heat from any heat exchange fluid therein by flowing a certain amount of RAM air over the RAM heat exchanger. Further, the bleed air heat exchanger is generally an "air to heat exchange fluid" heat exchanger which flows, e.g., bleed air from an LP compressor over heat exchange fluid to remove heat from the heat exchange fluid.

For the embodiment of FIG. 2, the one or more heat sink exchangers 108 of the thermal management system 100 depicted includes a plurality of individual heat sink exchangers 108. More particularly, for the embodiment of FIG. 2, the one or more heat sink exchangers 108 include two heat sink exchangers 108 arranged in series. However, in other exemplary embodiments, the one or more heat sink exchangers 108 may include any other suitable number of heat sink exchangers 108. For example, in other exemplary embodiments, a single heat sink exchanger 108 may be provided, at least three heat sink exchangers 108 may be provided, at least four heat sink exchangers 108 may be provided, or at least five heat sink exchangers 108 may be provided. Additionally, in still other exemplary embodiments, two or more of the heat sink exchangers 108 may alternatively be arranged in parallel flow with one another.

Referring still to the exemplary embodiment depicted in FIG. 2, it will be appreciated that the plurality of heat sink exchangers 108 and heat source exchangers 106 are each selectively in thermal communication with the thermal transport bus 102 (and selectively in fluid communication with the heat exchange fluid in the thermal transport bus 102). More particularly, the thermal management system 100 depicted includes a plurality of bypass lines 110 for selectively bypassing each heat sink exchanger 108 of the plurality of heat sink exchangers 108 and heat source exchanger 106 of the plurality of heat source heat exchangers 106. Each bypass line 110 extends between an upstream juncture 112 and a downstream juncture 114—the upstream juncture 112 located just upstream of a respective heat sink exchanger 108 or heat source heat exchanger 106, and the downstream juncture 114 located just downstream of the respective heat sink exchanger 108 or heat source heat exchanger 106. Additionally, each bypass line 110 meets at the respective upstream juncture 112 with the thermal transport bus 102 via a three-way heat sink valve 116. The three-way heat sink valves 116 each include an inlet fluidly connected with the thermal transport bus 102, a first outlet fluidly connected with the thermal transport bus 102, and a second outlet fluidly connected with the bypass line 110. The three-way heat sink valves 116 may each be a variable throughput three-way valve, such that the three-way heat sink valves 116 may vary a throughput from the inlet to the first and/or second outlets. For example, the three-way heat sink valves 116 may be configured for providing anywhere between zero percent (0%) and one hundred percent (100%) of the heat exchange fluid from the inlet to the first outlet, and similarly, the three-way heat sink valves 116 may be configured for providing anywhere between zero percent (0%) and one hundred percent (100%) of the heat exchange fluid from the inlet to the second outlet.

Notably, the three-way heat sink valves 116 may be in operable communication with a controller 115 of the turbofan engine 10 and/or of an aircraft including the turbofan engine 10 through one or more wired or wireless communications busses (depicted in phantom). The controller 115 may bypass one or more of the one or more heat sink exchangers 108 and/or heat source exchangers 106 based on, e.g., an operating condition of the turbofan engine 10 and/or aircraft, a temperature of the heat exchange fluid, and/or any other suitable variables. Alternatively, the controller 115 may bypass one or more of the one or more heat sink exchangers 108 and/or heat source exchangers 106 based on a user input.

Further, each bypass line 110 also meets at the respective downstream juncture 114 with the thermal transport bus 102. Between each heat sink exchanger 108 and downstream juncture 114, the thermal transport bus 102 includes a check valve 118 for ensuring a proper flow direction of the heat exchange fluid. More particularly, the check valve 118 prevents a flow of heat exchange fluid from the downstream juncture 114 towards the respective heat sink exchanger 108.

The thermal management system 100 of FIG. 2 may more efficiently remove heat from the various accessory systems of the turbofan engine 10 and/or the aircraft, and in a more efficient manner. For example, in the exemplary embodiments including a plurality of heat sink exchangers 108 having bypass capability, for example, the additional heat sink exchangers 108 have the benefit of adding redundancy to the thermal management system 100. For example, in the event of a failure of one or more of the heat sink exchangers 108 or associated portions of the thermal transport bus 102, the heat exchange fluid may be routed around such failure and the system 100 may continue to provide at least some heat removal.

Referring now to FIG. 3, a close-up, cross-sectional view of a gas turbine engine including a thermal management system 100 in accordance with an exemplary aspect of the present disclosure is provided. The gas turbine engine may be configured in a similar manner to the exemplary turbofan engine 10 described above with reference to FIG. 1, and further, the thermal management system 100 may be configured in a similar manner to the exemplary thermal management system 100 described above with reference to FIG. 2. Accordingly, the same or similar numbers may refer to same or similar parts.

For example, as is depicted the exemplary gas turbine engine of FIG. 3 generally includes a turbomachine 16 and an outer nacelle 50, with the turbomachine 16 at least partially surrounded by the outer nacelle 50. Moreover, the outer nacelle 50 defines a bypass airflow passage 56 with the turbomachine 16 (i.e., between the outer nacelle 50 and the turbomachine 16), and more specifically, defines the bypass airflow passage 56 between the outer nacelle 50 and an outer casing 18 of the turbomachine 16. Furthermore, the gas turbine engine includes an outlet guide vane 52 extending between the outer nacelle 50 and the turbomachine 16, the outlet guide vane 52 supporting the turbomachine 16 relative to the outer nacelle 50.

In such a manner, the gas turbine engine may be referred to as a turbofan engine (similar to the exemplary turbofan engine 10 of FIG. 1). Further, it will be appreciated from FIG. 3, and the discussion above with reference to FIG. 1, that the gas turbine engine may further define a relatively high bypass ratio, and therefore may be referred to as a "high-bypass" turbofan engine.

Referring still to FIG. 3, the exemplary turbomachine 16 depicted generally includes a compressor section, a combustion section 26, a turbine section, and an exhaust section 32. The compressor section, combustion section 26, turbine section, and exhaust section 32 together define at least in part a core air flowpath 37. Additionally, the compressor section generally includes a high pressure ("HP") compressor 24, and the turbine section generally includes a low pressure ("LP") turbine 30 and an HP turbine 28. The LP turbine 30 is coupled to, and configured to drive, an LP spool 36, and the HP turbine 28 is coupled to and configured to drive, an HP spool 34. Notably, the HP spool 34 is further coupled to the HP compressor 24, such that the HP turbine 28 may drive the HP compressor 24 through the HP spool 34.

The turbomachine 16 further includes a fuel delivery system 120 for providing a fuel flow to the combustion section 26 of the turbomachine 16. For example, the exemplary fuel delivery system 120 generally includes one or more fuel nozzles 122 configured to provide a mixture of fuel and air to a combustion chamber 124 of the combustion section 26, as well as a fuel pump 126 and a plurality of fuel lines 128. The fuel pump 126 may provide for the fuel flow through the plurality of fuel lines 128 from a fuel source (not shown) to the plurality of fuel nozzles 122. Further, it will be appreciated that in at least certain exemplary embodiments, the fuel delivery system 120 may be used as a heat sink.

Moreover, as stated the exemplary gas turbine engine depicted includes the thermal management system 100. In at least certain exemplary embodiments, the thermal management system 100 of the gas turbine engine of FIG. 3 may be configured in a similar manner as the exemplary thermal management system 100 described above with reference to FIG. 2. For example, the thermal management system 100 depicted generally includes a heat source heat exchanger 106 configured to collect heat from the turbomachine 16 during operation (i.e., collect heat from one or more components of the turbomachine 16 during operation), a heat sink heat exchanger 108 configured to reject heat during operation, and a thermal transport bus 102. The thermal transport bus 102 includes a heat exchange fluid configured to flow therethrough at a pressure within an operational pressure range during operation (see, also, FIG. 2). The heat source heat exchanger 106 and heat sink heat exchanger 108 are each thermally coupled to the thermal transport bus 102, and more specifically, to the heat exchange fluid within the thermal transport bus 102. In such a manner, the heat source heat exchanger 106 is operable to transfer heat to the heat exchange fluid flowing through the thermal transport bus 102 and the heat sink heat exchanger 108 is conversely operable to transfer heat from the heat exchange fluid flowing through the thermal transport bus 102.

Notably, it will be appreciated that as used herein, the term "heat source" and "heat sink" as used to describe a heat exchanger refer to typical operation of the heat exchanger with respect to the thermal management system 100 and thermal bus 102. For example, a heat source heat exchanger 106 refers to a heat exchanger that is generally operable to provide heat to the thermal management system 100 and thermal bus 102. However, relative to other systems to which it is thermally connected, the heat source heat exchanger 106 may act as a heat sink. Similarly, for example, a heat sink heat exchanger 108 refers to a heat exchanger that is generally operable to remove heat from the thermal management system 100 and thermal bus 102. However, relative to other systems to which it is thermally connected, the heat sink heat exchanger 108 may act as a heat source. Further, during certain operations of the engine and thermal management system 100, the heat source heat exchanger 106 may further be configured to act as a heat sink for the thermal management system 100 and the heat sink heat exchanger 108 may further be configured to act as a heat source for the thermal management system 100.

More specifically, for the embodiment depicted, the heat source heat exchanger 106 is a first heat source heat exchanger 106A, and the thermal management system 100 further includes a second heat source heat exchanger 106B. The first heat source heat exchanger 106A is, for the embodiment shown, a waste heat recovery heat exchanger. More specifically, for the embodiment depicted, the waste heat recovery heat exchanger is positioned to be in thermal communication with the core air flowpath 37 within or downstream of, the turbine section, the exhaust section 32, or both. More specifically, still, for the embodiment depicted, the waste heat recovery heat exchanger is integrated into an aft strut/outlet guide vane 31 of the LP turbine 30 at a downstream end of the LP turbine 30 of the turbomachine 16 (i.e., downstream of all turbine rotor blades within the turbine section of the gas turbine engine). Accordingly, the waste heat recovery heat exchanger may generally capture heat from the flow of gases through an aft portion of the turbine section and/or from a flow of exhaust through the exhaust section 32.

Further, it will be appreciated that the exemplary gas turbine engine depicted includes a cooling air system 80 (see, also FIG. 1), and the second heat source heat exchanger 106B is configured as a cooling air system heat exchanger for the cooling air system. As will be appreciated, the cooling air system may generally provide an airflow 132 from the compressor section to the turbine section, with such airflow 132 being used as cooling air for the turbine section. The cooling air system heat exchanger may remove heat from the airflow 132 from the compressor section prior to such airflow 132 being provided to the turbine section. In such a manner, the cooling air system heat exchanger may reduce a temperature of the airflow 132 being provided to the turbine section, such that the airflow 132 may be used more efficiently as cooling air.

Also for the embodiment depicted, the heat sink heat exchanger 108 is a first heat sink heat exchanger 108A, and the thermal management system 100 further includes a second heat sink heat exchanger 108B. The first heat sink heat exchanger 108A is, for the embodiment shown, a fuel heat exchanger thermally coupled to the fuel delivery system 120. More specifically, the fuel heat exchanger is thermally coupled to one of the plurality of fuel lines 128 of the fuel delivery system 120 such that the fuel heat exchanger may reject heat to a fuel flow therethrough. It will also be appreciated that although not depicted, the thermal management system 100 may include one or more valves and lines allowing the thermal management system 100 to bypass the fuel heat exchanger during certain operating conditions (see FIG. 2 and discussion above).

Moreover, for the embodiment depicted, the second heat sink heat exchanger 108B is a bypass airflow heat exchanger integrated into, or coupled to, one or more components positioned in, or otherwise exposed to, the bypass airflow passage 56. More specifically, for the embodiment depicted, the bypass airflow heat exchanger is integrated into, or coupled to, the outlet guide vane 52 of the gas turbine engine. In such a manner, the bypass airflow heat exchanger may reject heat to the airflow through the bypass airflow passage 56 during operation.

Furthermore, as is also depicted schematically in FIG. 3, the thermal management system 100 further includes a pump 104 and a heater 136. The pump 104 is configured to increase a pressure of the heat exchange fluid within the thermal transport bus 102 such that the heat exchange fluid operates as desired and/or flows through the thermal transport bus 102 as desired. Additionally, the heater 136 is configured to increase a temperature of the heat exchange fluid flowing through the thermal transport bus 102. For example, the heater 136 may be configured to increase a temperature of the heat exchange fluid within the thermal transport bus 102 during initial/startup operations, before the gas turbine engine has heated up. Such may therefore allow for the thermal engine system to operate in relatively low ambient temperature conditions.

Figure 4:
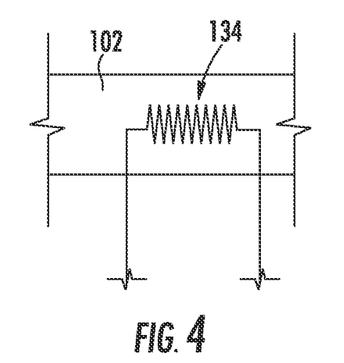
FIG. 4 is a schematic view of a heater in accordance with an exemplary embodiment of the present disclosure.
Figure 5:
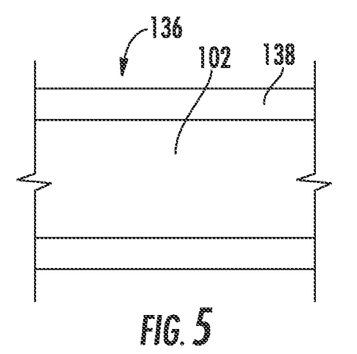
FIG. 5 is a schematic view of a heater in accordance with another exemplary embodiment of the present disclosure.
Figure 6:
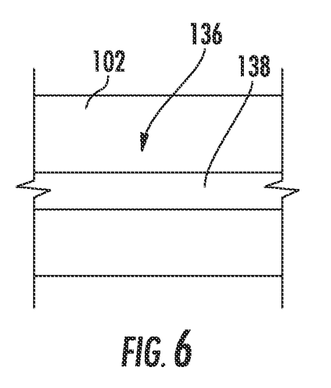
FIG. 6 is a schematic view of a heater in accordance with yet another exemplary embodiment of the present disclosure.

Referring now briefly to FIGS. 4 through 6, various embodiments of the exemplary heater 136 are depicted. For example, referring first to the exemplary embodiment of FIG. 4, a side, schematic view of a heater 136 in accordance with an exemplary embodiment of the present disclosure, as well as a section of the thermal transport bus 102 is provided. As shown, in certain exemplary embodiments, the heater 136 may be configured as an electric resistance heater. The electric resistance heater may be positioned in thermal communication with a length of the thermal transfer bus 102, either by physically contacting the thermal transport bus 102, being positioned within the thermal transport bus 102, or being positioned adjacent to thermal transport bus 102. In such a manner, the electric resistance heater may heat the heat exchange fluid within the thermal transport bus 102.

Additionally, or alternatively, referring now to FIG. 5, providing a side, schematic view of a heater 136 in accordance with another exemplary embodiment of the present disclosure, the heater 136 may utilize a heating fluid. For example, in certain embodiments, the heater 136 may include a conduit 138 extending around and coaxially with a length of the thermal transport bus 102 (i.e., surrounding the thermal transport bus 102, such that at least a length of the thermal transport bust 102 is positioned completely within the conduit 138 of the heater 136). In such a manner, the heater 136 may flow a heating fluid through the conduit 138 and around the thermal transport bus 102 to heat the thermal transport bus 102 (and the heat exchange fluid therein). More specifically, the heating fluid within the conduit 138 of the heater 136 may transfer heat to the thermal transport bus 102, which may in turn transfer heat to the exchange fluid within the thermal transfer bus.

Additionally, or alternatively, still, referring now to FIG. 6, providing a side, schematic view of a heater 136 in accordance with yet another exemplary embodiment of the present disclosure, the heater 136 may include a conduit 138 positioned within the thermal transport bus 102 (i.e., positioned completely within the thermal transport bus 102, such the thermal transport bus 102 completely surrounds the conduit 138 of the heater 134). For example, similar to the embodiment of FIG. 5, the heater 136 of FIG. 6 may utilize a heating fluid within the conduit 138. The conduit 138, which may be positioned within the thermal transport bus 102, extends generally coaxially with the thermal transport bus 102, such that the conduit 138 is completely surrounded by the thermal transport bus 102 and the heat exchange fluid therein. The conduit 138 may carry the heating fluid, which may transfer heat directly to the heat exchange fluid within the thermal transport bus 102. It will be appreciated, however, that in other exemplary embodiments, any other suitable heater 136 may be utilized for heating the heat exchange fluid within the thermal transport bus 102, or alternatively, no heater 136 may be utilized.

Referring now back to FIG. 3, it should be appreciated that in other exemplary embodiments of the present disclosure, the thermal management system 100 may be configured in any other suitable manner. For example, in other embodiments, the thermal management system 100 may include any other suitable number or type of heat source heat exchanger 106, as well as any other suitable number or type of heat sink heat exchanger 108, as discussed above with reference to FIG. 2. Further, the thermal management system 100 may also be integrated into, or utilized with, any other suitable gas turbine engine.

Referring still to FIG. 3, it will be appreciated that in order to operate in accordance with one or more of the exemplary aspects described herein, i.e., to accept heat from the one or more heat sources described herein, the heat exchange fluid configured to flow through the thermal transport bus 102 must be capable of operating over a relatively large operating temperature. For example, the heat exchange fluid must be able to flow at relatively low temperatures, e.g., during startup operations wherein the ambient temperature is relatively low, and further must not degrade at relatively high temperatures, e.g., during high-power operating modes wherein a relatively large amount of, e.g., waste heat is recovered and/or heat is removed from the cooling air system and/or other operating system(s). Accordingly, the thermal management system 100 described herein defines an operational temperature range at a pressure within an operational pressure range for the heat exchange fluid utilized within the exemplary thermal management system 100. The operational temperature range includes a lower temperature limit less or equal to than about zero degrees Fahrenheit at a pressure within the operational pressure range and an upper temperature limit greater than or equal to about 1000 degrees Fahrenheit at a pressure within the operational pressure range. It will be appreciated, that as used herein, the term "operational temperature range" refers generally to a temperature range at a pressure within the operational pressure range at which the heat exchange fluid may flow through the thermal transport bus 102 without substantially degrading itself or the thermal management system 100. Substantially degrading itself refers to the heat exchange fluid breaking down or changing into other substances (e.g., a lubrication oil coking), and substantially degrading the thermal management system 100 refers to prematurely wearing out the system such that sustained or repeated use at the conditions is not possible.

For example, in at least certain exemplary embodiments, in order to allow for such a relatively large operating temperature range, the heat exchange fluid may be a liquid metal alloy, a molten salt, a silicone oil, an ionic fluid, a pressurized gas, or a supercritical gas. For example, when the heat exchange fluid is a liquid metal alloy, the term "operational temperature range" may refer to a temperature range at which the liquid metal alloy remains in liquid form at a pressure within the operational pressure range, i.e., a temperature range higher than a melting point of the liquid metal alloy at a pressure within the operational pressure range and lower than a boiling point of the liquid metal alloy at a pressure within the operational pressure range. For example, the liquid metal alloy may be a eutectic alloy, such as a eutectic alloy including gallium, indium, tin, and/or other elements in any potential mass ratio. For example, the liquid metal alloy may be a substantially gallium, indium, and tin eutectic alloy, such as the eutectic alloy known as GALINSTAN, available from Geratherm Medical AG. When the heat exchange fluid is a liquid metal alloy, the operational pressure range may be relatively low, such as greater than zero pounds per square inch and less than about 500 pounds per square inch. More specifically, the operational pressure range may be a minimum pressure range required to provide the desired flow rate through the thermal transport bus 102.

Alternatively, as stated, in other exemplary embodiments, the exchange fluid may instead be a supercritical gas. For example, in certain exemplary embodiments, the supercritical gas may be a carbon dioxide gas. However, any other suitable supercritical gas may be used. When the heat exchange fluid is a supercritical gas, the term "operation temperature range" may refer to a temperature range within which the supercritical gas remains above its critical point at a pressure within the operational pressure range, and below a temperature limit for the thermal management system 100. For example, when a supercritical gas is utilized as a heat exchange fluid, the operational pressure range will be relatively high. For example, it will be appreciated that the supercritical gas will define a critical point pressure (i.e., a pressure above which the fluid does not have distinct liquid and gas phases, provided it is above a critical point temperature). With such an exemplary aspect, the operational pressure range may be greater than the critical point pressure of the supercritical gas, such as (depending on the particular supercritical gas used) greater than about 700 pounds per square inch and less than about 8000 pounds per square inch.

For example, in certain exemplary aspects, the operational pressure range may be greater than about 1000 pounds per square inch, greater than about 1500 pounds per square inch, greater than about 2000 pounds per square inch, or greater than about 2500 pounds per square inch and less than about 4,500 pounds per square inch.

Accordingly, it will be appreciated that the lower temperature limit of the operational temperature range defined by the heat exchange fluid at a pressure within the operational pressure range may be between about −100 degrees Fahrenheit and about −5 degrees Fahrenheit, such as less than about −10 degrees Fahrenheit, such as less than about −15 degrees Fahrenheit, such as less than about −25 degrees Fahrenheit, such as less than about −50 degrees Fahrenheit. Furthermore, in at least certain exemplary embodiments, the upper temperature limit of the operational temperature range defined by the heat exchange fluid at a pressure within the operational pressure range may be between about 1000 degrees Fahrenheit and about 1800 degrees Fahrenheit, such as greater than about 1050 degrees Fahrenheit, such as greater than about 1100 degrees Fahrenheit, such as greater than about a 1150 degrees Fahrenheit, such as greater than about 1200 degrees Fahrenheit. Further, the upper temperature limit of the operational temperature range may be less than about 3000 degrees Fahrenheit.

Inclusion of heat exchange fluid in accordance with one or more these exemplary embodiments may allow for a thermal management system that is capable of more efficiently managing thermal needs of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
   a turbomachine; and
   a thermal management system comprising
      a first heat exchanger configured to collect heat from the turbomachine during certain operations;
      a second heat exchanger disposed outside of the turbomachine;
      a third heat exchanger disposed within an outlet guide vane of the turbomachine; and
      a thermal transport bus configured to have a heat exchange fluid flow therethrough at a pressure within an operational pressure range, the first heat exchanger and second heat exchanger each fluidly coupled to the thermal transport bus such that the first heat exchanger is operable to transfer heat to the heat exchange fluid during at least the certain operations and the second heat exchanger is operable to transfer heat from the heat exchange fluid during at least the certain operations, the thermal management system defining an operational temperature range for the heat exchange fluid, the operational temperature range having a lower temperature limit less than zero degrees Fahrenheit at a pressure within the operational pressure range and an upper temperature limit of at least 1000 degrees Fahrenheit at a pressure within the operational pressure range.

2. The gas turbine engine of claim 1, wherein the first heat exchanger is a heat recovery heat exchanger.

3. The gas turbine engine of claim 2, wherein the turbomachine comprises a turbine section and an exhaust section, the turbine section and exhaust section together defining at least in part a core air flowpath, and wherein the heat recovery heat exchanger is a waste heat recovery heat exchanger positioned to be in thermal communication with the core air flowpath within or downstream of the turbine section, the exhaust section, or both.

4. The gas turbine engine of claim 2, wherein the turbomachine comprises a fuel delivery system, and wherein the second heat exchanger is a fuel heat exchanger thermally coupled to the fuel delivery system.

5. The gas turbine engine of claim 1, wherein the turbomachine comprises a cooling air system, and wherein the first heat exchanger is thermally coupled to the cooling air system.

6. The gas turbine engine of claim 1, wherein the lower temperature limit of the operational temperature range at a pressure within the operational pressure range is between about −100 degrees Fahrenheit and about −5 degrees Fahrenheit.

7. The gas turbine engine of claim 6, wherein the upper temperature limit of the operational temperature range at a pressure within the operational pressure range is between about 1000 degrees Fahrenheit and about 1800 degrees Fahrenheit.

8. The gas turbine engine of claim 1, wherein the heat exchange fluid is at least one of a liquid metal alloy, a molten salt, a silicone oil, an ionic fluid, a pressurized gas, or a supercritical gas.

9. The gas turbine engine of claim 1, wherein the heat exchange fluid is a liquid metal alloy, and wherein the operational pressure range is greater than zero pounds per square inch and less than about 500 pounds per square inch.

10. The gas turbine engine of claim 1, wherein the heat exchange fluid is a eutectic metal alloy comprising gallium, indium, and tin.

11. The gas turbine engine of claim 1, wherein the heat exchange fluid is a pressurized gas.

12. The gas turbine engine of claim 1, wherein the heat exchange fluid is a supercritical gas, wherein the supercritical gas defines critical point pressure, wherein the operational pressure range is greater than the critical point pressure of the supercritical gas and up to about 8000 pounds per square inch.

13. The gas turbine engine of claim 12, wherein the heat exchange fluid is a supercritical gas, and wherein the operational pressure range is greater than about 1000 pounds per square inch and less than about 8000 pounds per square inch.

14. The gas turbine engine of claim 1, further comprising:
   an outer nacelle at least partially surrounding the turbomachine; and
   an outlet guide vane extending between the outer nacelle and the turbomachine, wherein the second heat exchanger is integrated into, or coupled to, the outlet guide vane.

15. The gas turbine engine of claim 1, wherein the thermal management system further comprises a heater thermally coupled to the thermal transport bus for heating the thermal transfer fluid within the thermal transfer bus.

16. The gas turbine engine of claim 1, wherein the first heat exchanger is a first heat source heat exchanger, wherein the thermal management system further comprises a second heat source heat exchanger, wherein the first heat source heat exchanger is a waste heat recovery heat exchanger, and wherein the second heat source heat exchanger is a cooling air system heat exchanger.

17. The gas turbine engine of claim 1, wherein the second heat exchanger is a fuel heat exchanger, and wherein the thermal management system further comprises a bypass airflow passage heat exchanger.

18. A gas turbine engine comprising:
- a compressor section, a combustion section, a turbine section, and an exhaust section arranged in serial flow order and together defining a core air flowpath;
- a fuel delivery system for providing a flow of fuel to the combustion section; and
- a thermal management system comprising
  - a first heat exchanger positioned to be in thermal communication with a flow through the core air flowpath within or downstream of the turbine section, the exhaust section, or both;
  - a second heat exchanger in thermal communication with the fuel delivery system for transferring heat to the flow of fuel provided to the combustion section;
  - a third heat exchanger disposed within an outlet guide vane of the turbomachine; and
  - a thermal transport bus having a heat exchange fluid flowing therethrough, the first heat exchanger and second heat exchanger each fluidly coupled to the thermal transport bus;
  - wherein the thermal management system defines an operational temperature range for the heat exchange fluid, the operational temperature range having a lower temperature limit less than zero degrees Fahrenheit at a pressure within the operational pressure range and an upper temperature limit of at least 1000 degrees Fahrenheit at a pressure within the operational pressure range.

19. The gas turbine engine of claim 18, wherein the heat exchange fluid is at least one of a molten salt, a silicone oil, an ionic fluid, a liquid metal alloy, or a supercritical gas.

* * * * *